United States Patent [19]
Primot et al.

[11] Patent Number: 5,606,417
[45] Date of Patent: Feb. 25, 1997

[54] ACHROMATIC OPTICAL INTERFEROMETER, OF THE TRILATERAL SHIFT TYPE FOR ANALYZING THE WAVE SURFACE OF A LIGHT BEAM

[75] Inventors: Jérôme Primot, Chatillon; Ludovic Sogno, Paris, both of France

[73] Assignee: Office National D'Etudes Et De Recherches Aerospatiales, Chatillon, France

[21] Appl. No.: 341,162

[22] Filed: Nov. 16, 1994

[30] Foreign Application Priority Data

Nov. 24, 1993 [FR] France .................................. 93 14063

[51] Int. Cl.$^6$ ............................................ G01B 9/02
[52] U.S. Cl. .................................. 356/354; 356/358
[58] Field of Search .................................. 356/353, 354, 356/359, 360

[56] References Cited

U.S. PATENT DOCUMENTS

| | | | |
|---|---|---|---|
| 4,413,909 | 11/1983 | Pohle | 356/354 |
| 4,518,854 | 5/1985 | Hutchin . | |
| 4,670,646 | 6/1987 | Spivey | 356/354 |
| 4,707,137 | 11/1987 | Lee | 356/354 |
| 5,159,407 | 10/1992 | Chuanside | 356/354 |

FOREIGN PATENT DOCUMENTS

0538126A1  4/1993  European Pat. Off. .
213057  8/1984  Germany .

OTHER PUBLICATIONS

Jerome Primot, "Three-wave lateral shearing interferometer", *Applied Optics*, vol. 32. No. 31, Nov. 1, 1993, pp. 6242–6249.

Francois Roddier, "Variations on a Hartmann theme", *Optical Engineering*, vol. 29 No. 10, Oct. 1990, pp. 1239–1242.

*Primary Examiner*—Samuel A. Turner
*Attorney, Agent, or Firm*—Spencer & Frank

[57] ABSTRACT

A device for analyzing the wave surface of a light beam has an entry lens which defines a reference plane, optically conjugate with the plane in which the wave surface of the light beam is analysed. A bidimensional meshed lattice is placed in this reference plane, perpendicularly to the beam. The different sub-beams, due to the different orders of diffraction, are focused jointly by a first lens, in an intermediate focal plane, in the vicinity of which a mask selects, from the sub-beams, those which relate to at least three distinct orders of diffraction. A second lens takes the selected sub-beams to a nil-sensitivity plane, conjugate with the plane of the lattice. An interference image is observed in a working plane, situated at a chosen distance from the nil-sensitivity plane. The device can be characterized as an improved achromatic optical interferometer, of the trilateral shift type.

20 Claims, 8 Drawing Sheets

FIG. 10 B

ACHROMATIC OPTICAL INTERFEROMETER, OF THE TRILATERAL SHIFT TYPE FOR ANALYZING THE WAVE SURFACE OF A LIGHT BEAM

BACKGROUND OF THE INVENTION

The invention is intended for the analysis of the wave surface of a light beam.

This type of analysis enables optical elements to be checked, and optical apparatus to be certified. It also permits the study of physical phenomena not measurable directly, such as variations in optical index within turbulent environments that may be encountered when passing through the earth's atmosphere, or in a wind-tunnel air stream, for example.

The so-called "Hartmann-Shack" analyser is known, described in "Phase measurements systems for adaptative optics", J. C. WYANT, AGARD Conf. Proc., No 300, 1981. The general working principle consists of optically conjugating the phase defect to be analysed with a grid of micro-lenses. In the common plane of the foci of the micro-lenses, an interferogram is observed, consisting of a lattice of spots, deformed according to the gradients of the wave surface.

This type of wave surface analyser has the advantage of functioning in polychromatic light, so long as the operating difference defect to be detected is not dependent on the wavelength. The light output is very good; on the other hand, the sensitivity and the dynamics can be adjusted only by changing the grid of micro-lenses.

In its European patent application EP-A-0538126, the applicant described a trilateral shift interferometer. Through a mirror-based assembly, the beam to be analysed is optically subdivided, in a conjugate plane of the defect, into three sub-beams. A special optical treatment of the three sub-beams thus obtained enables an interferogram to be observed which is sensitive to the gradients of the wave surface, and this with a possibility of continuous adjustment of the dynamics and of the sensitivity. It is also possible to estimate the error in measuring from the measurement itself; finally, the system of interference fringes obtained is easy to interpret, and particularly suited to analysis techniques based on Fourier transforms. On the other hand, this apparatus functions only with monochromatic light, and its light output is not as high as that of the Hartmann-Shack analyser.

It therefore appears to be extremely desirable to have an interferometer possessing both the flexibility of adjustment of the interferometer with trilateral shift of EP-A-0538126, and the light output of the Hartmann-Shack analyser.

SUMMARY OF THE INVENTION

The aim of the present invention is to afford an improvement in this direction. Another aim of the present invention is to provide an improved achromatic optical interferometer, of the trilateral shift type.

The invention may be considered either as a method or as a device.

The proposed method is of the type in which:

a) a diffraction lattice with bidimensional array is placed in a plane perpendicular to the light beam to be analysed, and optically conjugated with the analysis plane of the wave surface under consideration, thereby causing a diffraction of the beam into different sub-beams, due to the different orders of diffraction, and b) an image formed by the interference of the sub-beams is created and observed in a plane, an image whose deformations are related to the gradient of the wave surface analysed.

The above arises from an interpretation of the functioning of an analyser of the Hartmann-Shack type. This interpretation, which does not correspond to the conventional description of this analyser, was outlined in the publication "Variations on a Hartman theme", F. RODDIER, SPIE, TUXON, 1990.

According to one aspect of the invention, operation b) comprises:

b1) the combined focusing of the sub-beams issuing from the plane of the lattice, in a so-called "intermediate" focal plane, b2) in the vicinity of this focal plane, the filtering of the sub-beams by a mask suitable for selecting there at least three distinct orders of diffraction, b3) the optical picking up of the selected sub-beams, in order to bring them to a so-called "nil-sensitivity" plane, conjugate with the plane of the lattice, and b4) the observation of the interference image in a working plane, situated at a chosen distance from the nil-sensitivity plane.

This permits functioning in polychromatic light. By adjusting the distance between the working plane and the nil-sensitivity plane, the sensitivity and the dynamics of the apparatus are continuously regulated.

The three extracted sub-beams preferably possess similar intensities, and impacts that are not aligned in the intermediate focal plane, advantageously being impacts located at the vertices of an equilateral triangle.

This may be brought about through the use of diffraction lattices with hexagonal or rectangular array. They define respectively, in the intermediate focal plane, a reciprocal regular hexagonal or rectangular array; this reciprocal array is the basis for what is referred to here as the different orders of diffraction. The basic array pattern of the diffraction lattice is so defined as to obtain three orders of diffraction, of neighbouring intensities, situated at three of the vertices of a hexagon of the reciprocal array, defining an equilateral triangle.

The filtration mask placed in the focal plane may be either transparent, or reflective, or a combination of these two types.

The invention also proposes a new diffraction lattice, which is particularly advantageous.

It also covers devices capable of permitting the implementation of the proposed method. Such a device is of the type comprising:

an entry lens, conjugating a reference plane with the plane in which the wave surface is analysed, a lattice with bidimensional array, placed in this reference plane, perpendicularly to the beam, which causes a diffraction of the beam into different sub-beams due to the different orders of diffraction, and means for optical processing and observation of the image formed by the interference of the sub-beams, an image whose deformations are related to the gradient of the wave surface analysed.

According to the invention, the optical processing and observation means comprise:

a first lens for focusing jointly the sub-beams coming from the plane of the lattice in a so-called "intermediate" focal plane, in this focal plane or close to it, a mask suitable for selecting from the sub-beams those which come from at least three distinct orders of diffraction, a second lens for taking the selected sub-beams to a so-called "nil-sensitivity" plane, conjugate with the plane of the lattice, and means for observing the interference image in a working plane, situated at a chosen distance from the nil-sensitivity plane.

The device is of course open to the arrangements envisaged for the method.

Other characteristics and advantages of the invention will become apparent from an examination of the detailed description given hereinafter, and of the accompanying drawings.

DETAILED DESCRIPTION OF THE PREFERRED EMBODIMENTS

Figure 1:
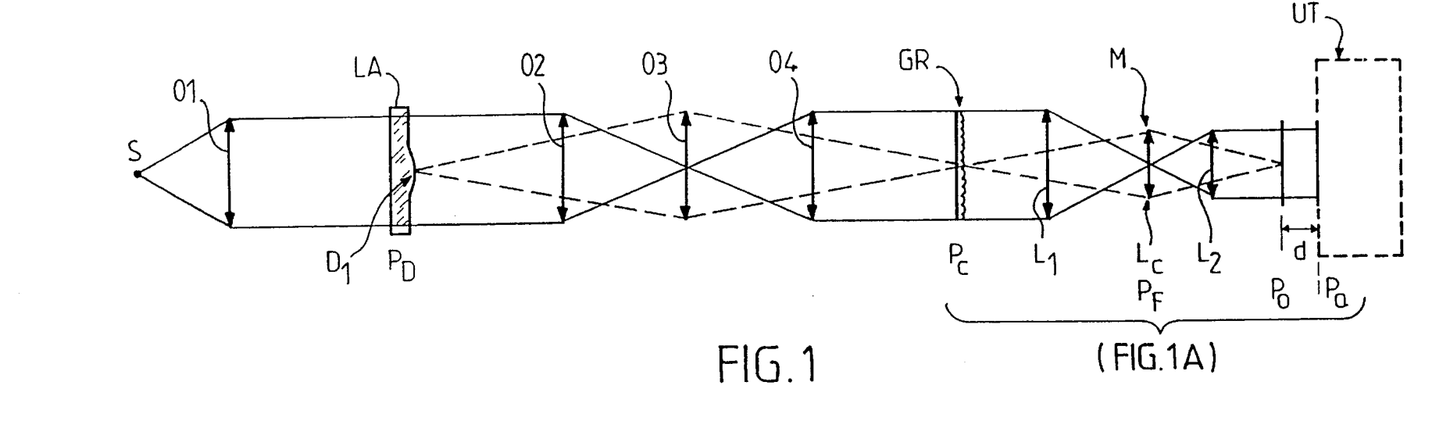
FIG. 1 is a outline optical diagram of a device enabling the invention to be implemented.

In FIG. 1, a source of light S is placed at the focus of a collimator lens $0_1$. Contrary to that which was the case with the prior patent application EP-A-0538126, the light source S does not need to be monochromatic.

The parallel light beam emerging from the lens $O_1$ illuminates a sample to be tested, which is shown schematically as a strip having parallel faces LA, placed in the plane $P_D$ and having a flatness defect $D_1$. Of course, the sample may be any other optical system (a lens or a mirror, in particular a telescope mirror), or even simply an area of a gaseous or liquid medium disturbed by a flow, for example.

Then, an afocal system is preferably used, consisting for example of two lenses $O_2$ and $O_4$, with, in intermediate position, a field lens $O_3$. The function of this afocal system is to create, in a plane $P_C$, an image of the plane $P_D$. Other means producing an optical conjugation between these two planes may be suitable.

The aim is to bring about a matching of the diameter of the beam, between the planes $P_D$ and $P_C$.

Figure 1A:
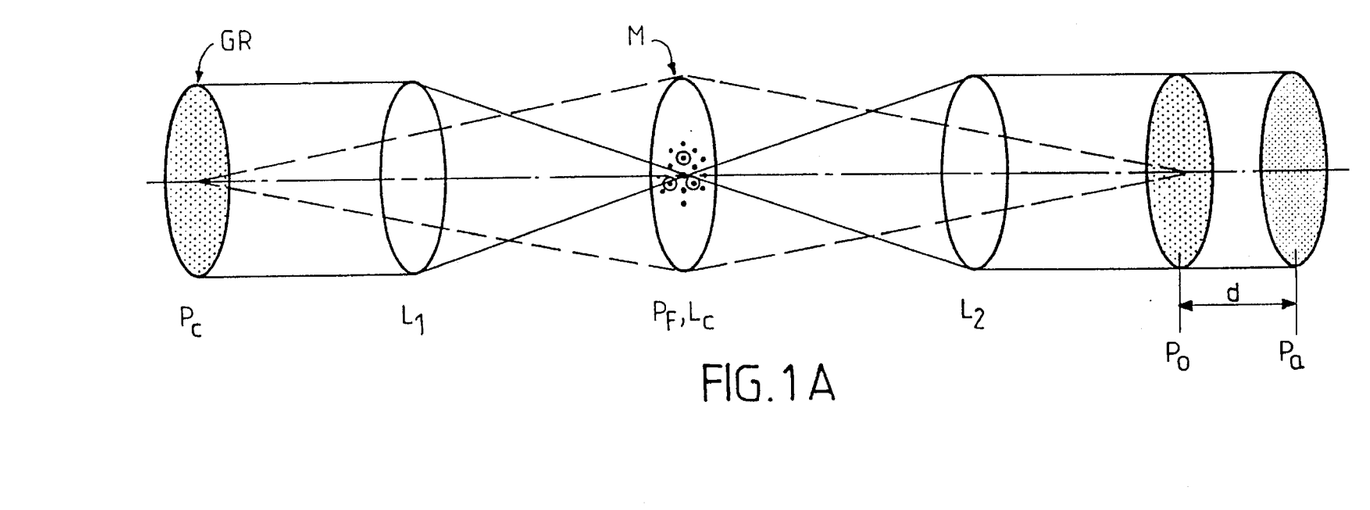
FIG. 1A is a partial view in perspective of the same device.

The next part of the assembly is shown in more detail, in semi-perspective, in FIG. 1A.

In the plane $P_C$ is placed a lattice GR, described below.

The assembly then comprises an afocal system, consisting of the lenses $L_1$ and $L_2$ with, preferably, a field lens $L_C$, placed in the vicinity of the focusing plane $P_F$ of the lens $L_1$. In the vicinity of this focusing plane $P_F$, and, preferentially, in this plane $P_F$, is a mask M, also described below.

This afocal system creates a plane $P_0$, known as the nil-sensitivity plane, conjugate with the plane $P_C$. According to the invention, observation of the interference image is effected in a plane $P_a$, situated at a chosen distance d from the plane $P_0$.

Figure 2A:
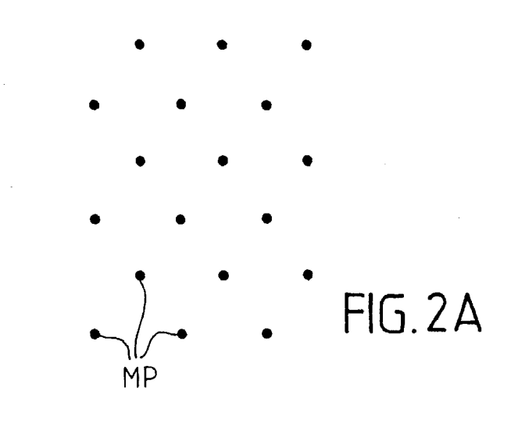
FIGS. 2A to 2F show a flat array, the array element and the constitution of a bidimensional diffraction lattice.
Figure 2B:
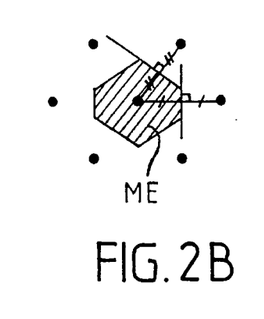
Figure 2C:
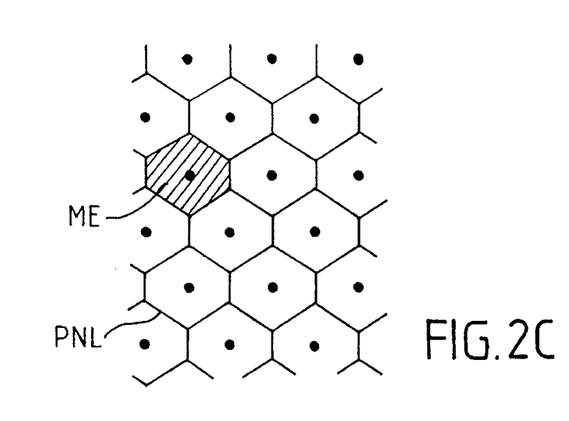
Figure 2D:
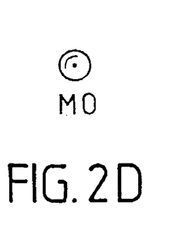
Figure 2E:
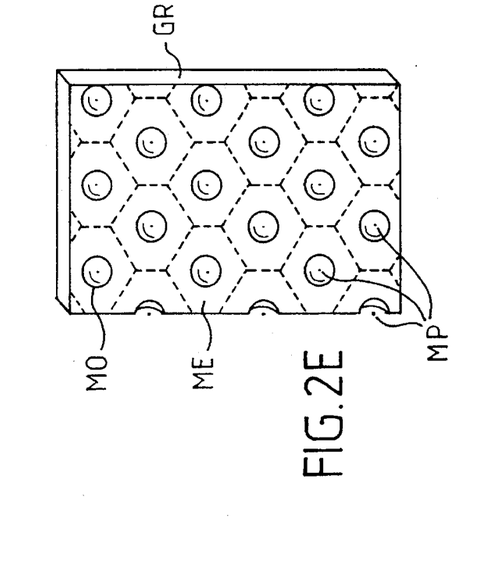

FIGS. 2A to 2F show a bidimensional lattice (GR) and its mode of construction. A flat array (MP) consists of a set of points regularly disposed in two directions (FIG. 2A). These points define an array element (ME, FIG. 2B). The array element is the smallest surface area permitting a non-lacunar paving (PNL) of the array plane in both directions defining it (FIG. 2C). The perimeter of the array element is the minimum surface area polygon whose sides are carried by the mid-perpendiculars of the segments connecting any point in the plane to each of its closest neighbours (FIG. 2B).

Figure 2F:
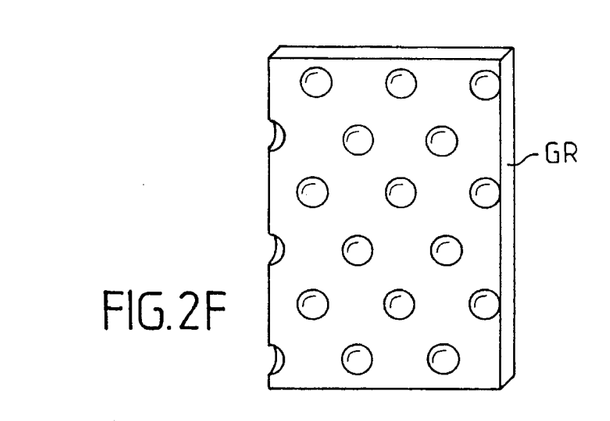

The lattice GR is a bidimensional lattice. Bidimensional lattice (GR) refers to the repetition as often as desired (in theory, to infinity) of a basic pattern (MO, FIG. 2D) disposed in a flat array (MP, FIG. 2E). The basic pattern determines the distribution of intensities of the orders of diffraction of the lattice. A flat array may define hexagonal, rectangular or square array elements. The array itself is not visible in the final lattice GR (FIG. 2F).

There is a change from the array of the lattice under consideration to the array of the orders of diffraction termed reciprocal array by means of a transformation (marked T.F. in the drawings). The array element will determine the reciprocal array supporting the diffracted orders in the plane $P_F$. Physically, this transformation may be interpreted in the following way: in the intermediate focal plane $P_F$, the spatial Fourier transform (bidimensional) is obtained from the complex amplitude of the incident light wave, after passing through the lattice GR.

Figure 3A:
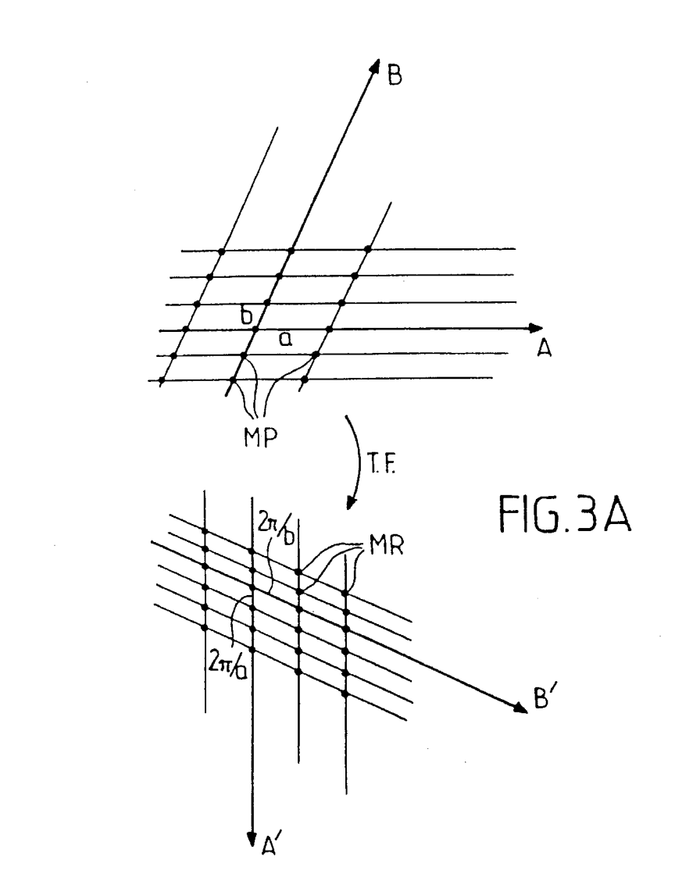
FIG. 3A illustrates an array and its reciprocal array.

FIG. 3A shows how a flat array MP is constructed from its two axes A and B. These axes are not necessarily perpendicular to one another. The array element is repeated with a periodicity a along the axis A, and b along the axis B.

In order to change to the reciprocal array MR, an axis A' is constructed perpendicular to A and an axis B' perpendicular to B. Two standard vectors $2\pi/a$ and $2\pi/b$ are considered, associated with the axes A' and B' respectively.

The reciprocal array points are those in this plane which are located by vectors G defined in the following manner:

$$G = A' \cdot m + B' \cdot n$$

where m and n are any positive or negative integers.

Figure 3B:
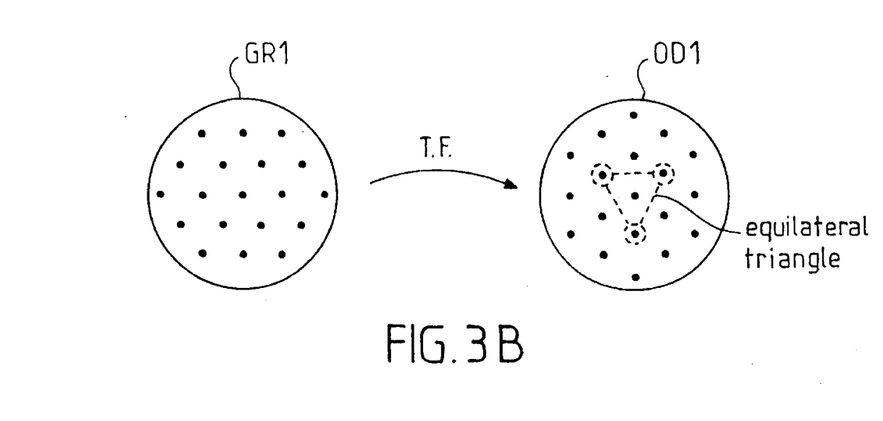
FIGS. 3B and 3C illustrate hexagonal and rectangular arrays, and their respective reciprocal arrays.
Figure 3C:
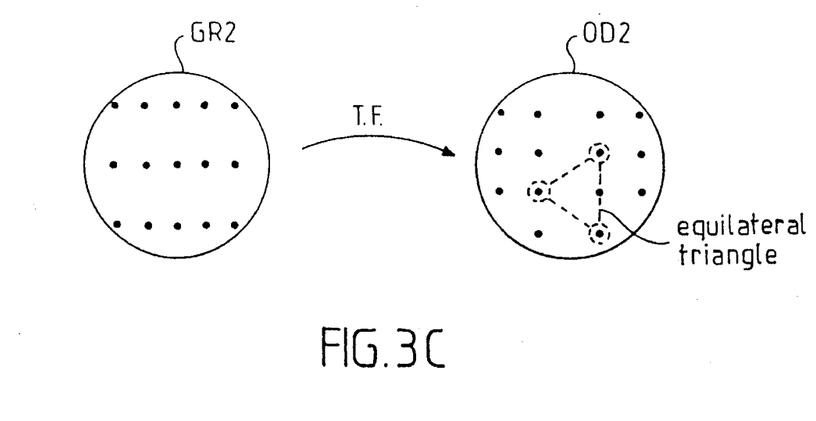

One interesting condition for the implementation of the present invention is that the arrays employed provide a reciprocal array supporting three orders of diffraction placed at the points of an equilateral triangle in the plane $P_F$. This is illustrated in FIG. 3B as OD1 for the lattice GR1, and in FIG. 3C as OD2 for the lattice GR2.

In the focusing plane $P_F$, or nearby, a mask M is then placed, suitable for selecting the three orders of diffraction required, which must be non-aligned, preferably of similar and, if possible, maximum intensities.

It is possible to imagine a number of diffraction orders greater than three being used, for example for reasons of light output or difficulties in producing specific lattices. This will, however, work to the detriment of the simplicity of analysing the interferogram and the ease of adjusting the sensitivity.

Figure 4A:
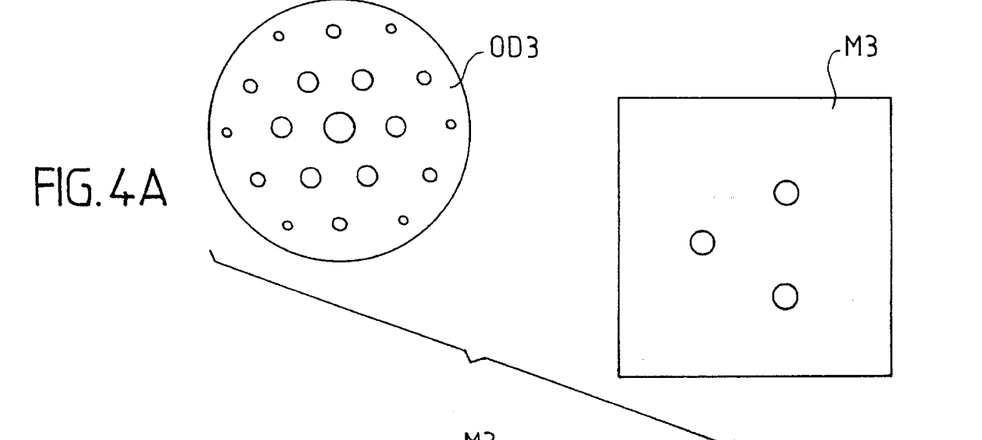
FIGS. 4A to 4C are explanatory diagrams enabling the invention to be better understood.
Figure 4B:
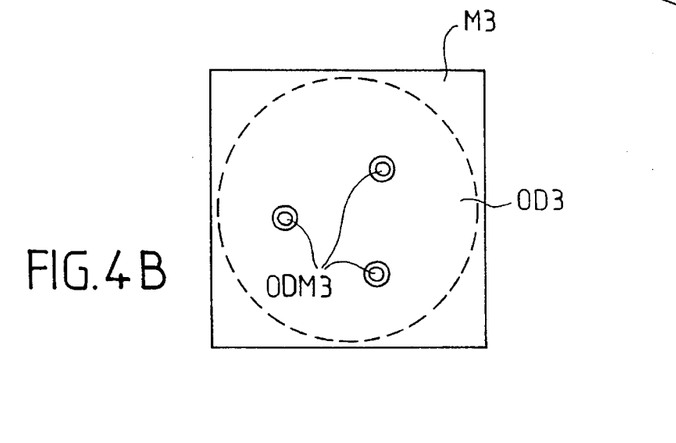
Figure 4C:
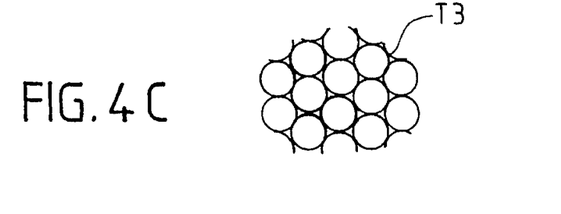

FIGS. 4 to 4C illustrate the working principle of the invention according to the assembly shown in FIG. 1A.

FIG. 4A shows the orders of diffraction $OD_3$ obtained in the plane $P_F$ with a hexagonal array lattice. The mask $M_3$ is a screen with three holes in it so chosen as to take three orders of diffraction situated at the vertices of an equilateral triangle. Only the orders of diffraction illustrated as $ODM_3$ in FIG. 4B therefore pass through the mask. In the analysis plane $P_a$, a system of spots $T_3$ (FIG. 4C) is then obtained, which enables information on the phase defects of the wave surface, for example defect D in FIG. 1, to be obtained.

In order to ensure a good contrast of interference fringes in the plane $P_a$, it is desirable for the intensities of the three orders of diffraction selected by the mask to be more or less equal.

Preferentially, the aim will be to translate the observation plane $P_a$ in a direction such that the contrast of the interference fringes is substantially independent of the distance d between this plane $P_a$ and the nil-sensitivity plane $P_0$.

Figure 5:
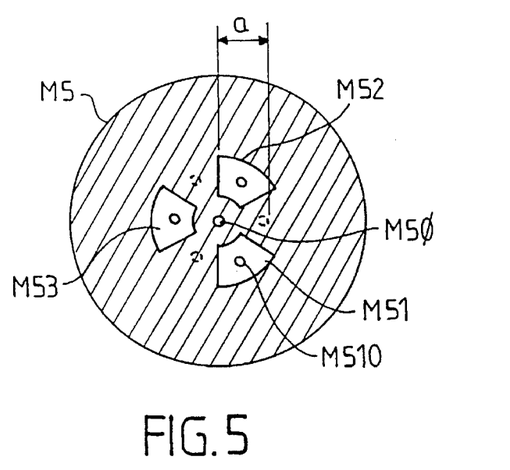
FIGS. 5 and 5A are two corresponding illustrations enabling the functioning of the mask according to the present invention to be better understood.

An example of a mask is illustrated in FIG. 5, where the mask $M_5$ has three orifices $M_{51}$, $M_{52}$ and $M_{53}$, shaped as sectors of circular rings evenly distributed about the central axis $M_{50}$. In the centre of each sector such as $M_{51}$, the order of diffraction for the centre of the optical band under consideration is illustrated at $M_{510}$.

Figure 5A:
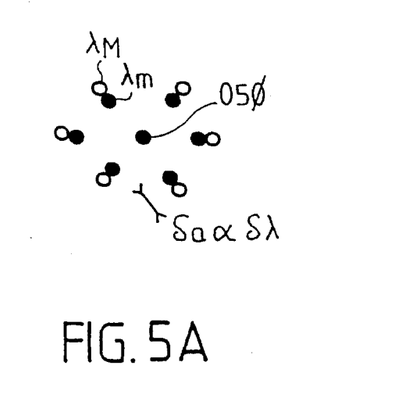

If the central order $O_{50}$ is independent of the wavelength, the position of the other orders of diffraction depends on the wavelength. Thus FIG. 5A shows the positions corresponding to $\lambda_m$ and $\lambda_M$, minimum and maximum values of the band of optical wavelengths being dealt with. The distance $\delta\alpha$ between the extreme positions of the two spots observed is proportional to the distance $\delta\lambda$ between the wavelengths, where $\delta\lambda=\lambda_M-\lambda_m$.

When the width of the spectral domain increases, the orders diffracted in the intermediate focal plane $P_F$ spread out. The surface area of the mask used in transmission increases with the distance between the wavelengths. In other words, it is at the level of the mask that the width of the spectral domain being analysed may be defined.

Figure 6:
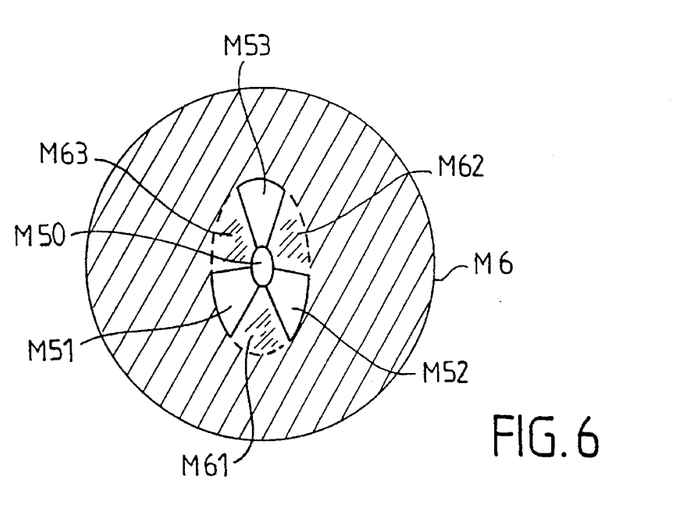
FIG. 6 illustrates a variant of the mask.

In FIG. 6, between the sectors $M_{51}$, $M_{52}$ and $M_{53}$, reflective sectors are interposed, $M_{61}$, $M_{62}$ and $M_{63}$ respectively. The centre $M_{50}$ is absorbent.

Figure 7:
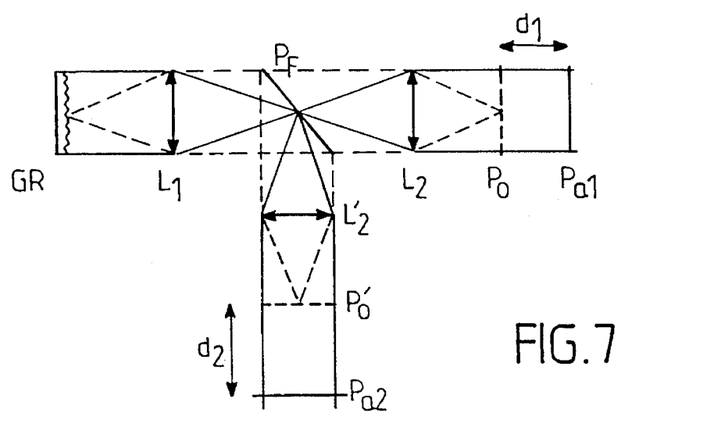
FIG. 7 illustrates a corresponding variant of the device according to the invention.

Such a mask may be used in the assembly illustrated in FIG. 7. In this variant, there is no field lens $L_C$. The lens $L_2$ collimates the orders of diffraction transmitted by the sectors $M_{51}$ to $M_{53}$. In the perpendicular direction, another lens $L'_2$ collimates the orders of diffraction reflected by the sectors $M_{61}$ to $M_{63}$. The impossibility of or the difficulty in providing a field lens $L_C$ in this assembly may be compensated for by an appropriate choice of the two collimator lenses $L_2$ and $L'_2$. The assembly then has two analysis planes $P_{a1}$ and $P_{a2}$, which may be chosen at different distances $d_1$ and $d_2$ from their respective nil-sensitivity planes $P_0$ and $P'_0$. Both interferograms thus obtained enable a single wave surface to be analysed according to two independent scales of dynamics.

The shapes of the sectors illustrated in FIG. 6 are adapted to take account of the fact that the mask $M_6$ is inclined with respect to the axis of the incident beam emerging from the lens $L_1$, as may be seen from FIG. 7.

This assembly is well suited to the case of hexagonal lattices, with an array element possessing central symmetry, since six orders of equal intensity then exist, forming two equilateral triangles brought together in the manner of a Star of David, and hence the interest of a mask such as $M_6$, produced on an elliptical ring.

The configuration shown in FIG. 7 enables two interferograms to be recorded simultaneously from a single wave surface.

The bidimensional lattices used in the invention may be phase lattices or so-called intensity lattices.

Figure 8A:
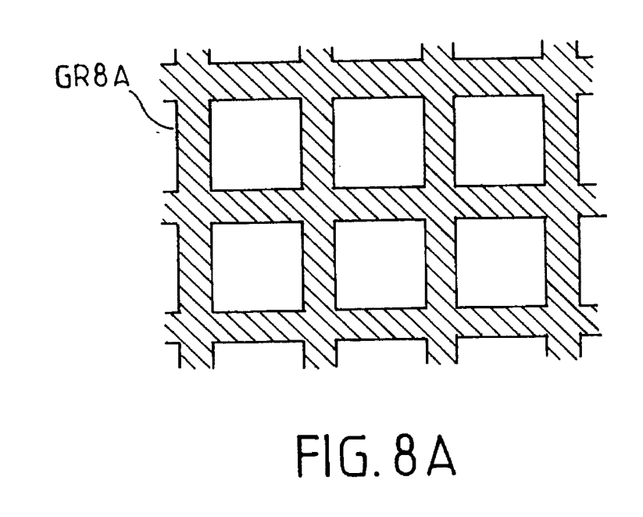
FIGS. 8A to 8C illustrate other types of bidimensional lattices that may be used according to the invention.
Figure 8B:
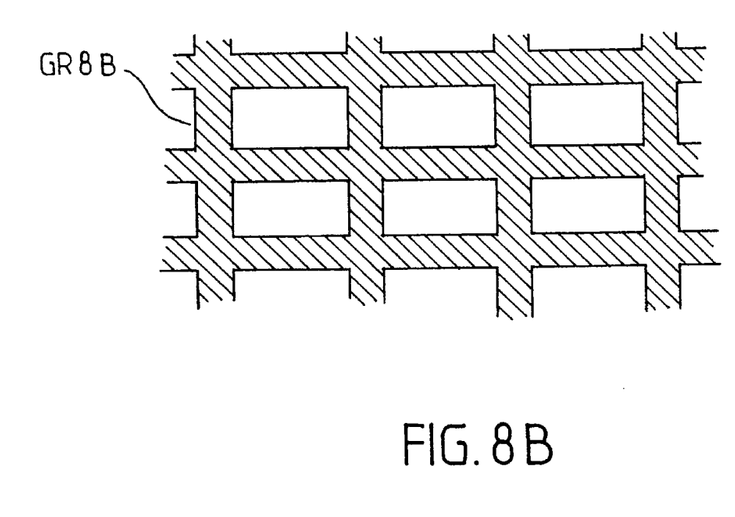
Figure 8C:
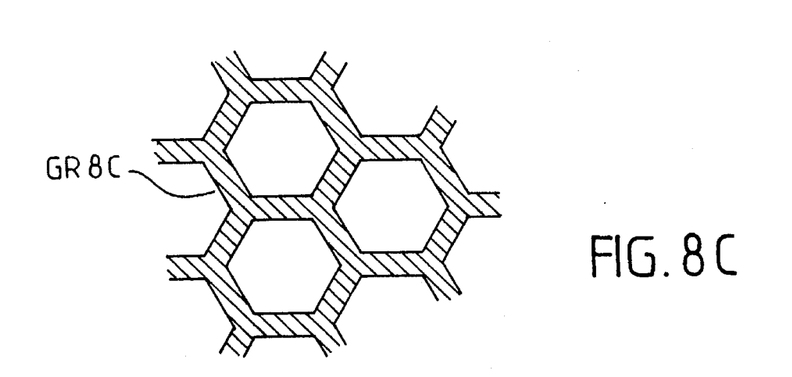

The FIG. 8 show some examples of intensity lattices. FIG. 8A illustrates a lattice GR8A of the Ronchi crossed type with a square base. FIG. 8B illustrates a lattice GR8B of the Ronchi crossed type with a rectangular base. FIG. 8C illustrates a lattice GR8C with a honeycomb pattern. The hatched areas of these figures may be either of nil transmission or unity transmission. The width of the areas may be adapted according to needs, so long as the size of the array element is not changed.

The lattice GR8C provides better symmetry for the selection of three orders placed at the vertices of an equilateral triangle.

It is possible to optimize the light output of these lattices, by changing the ratio between dark areas and transparent areas. By using an intensity lattice that is partly reflective and partly transparent, it is possible to envisage a two-path system.

As a variant, phase lattices may be used, in particular microlens lattices.

However, the best lattices, in the opinion of the applicant, are phase lattices with hexagonal array element, optimising the transfer of light energy in three orders of diffraction placed around the zero order and situated at the vertices of an equilateral triangle.

These lattices are produced from transparent or reflective materials, at the analysis wavelengths, and formed from trihedrons with ternary symmetry, situated at the centres of the hexagonal array elements, and orientated so that the edges intercept the vertices of the array elements. A trihedron constitutes the basic pattern for such a lattice.

Figure 9A:
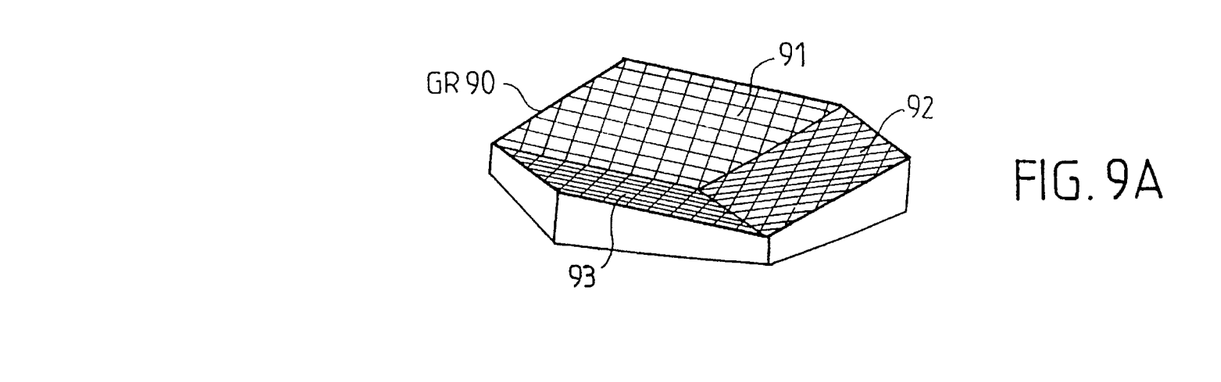
FIGS. 9A and 9B illustrate a preferential variant, respectively of the basic pattern and of the lattice according to the invention.
Figure 9B:
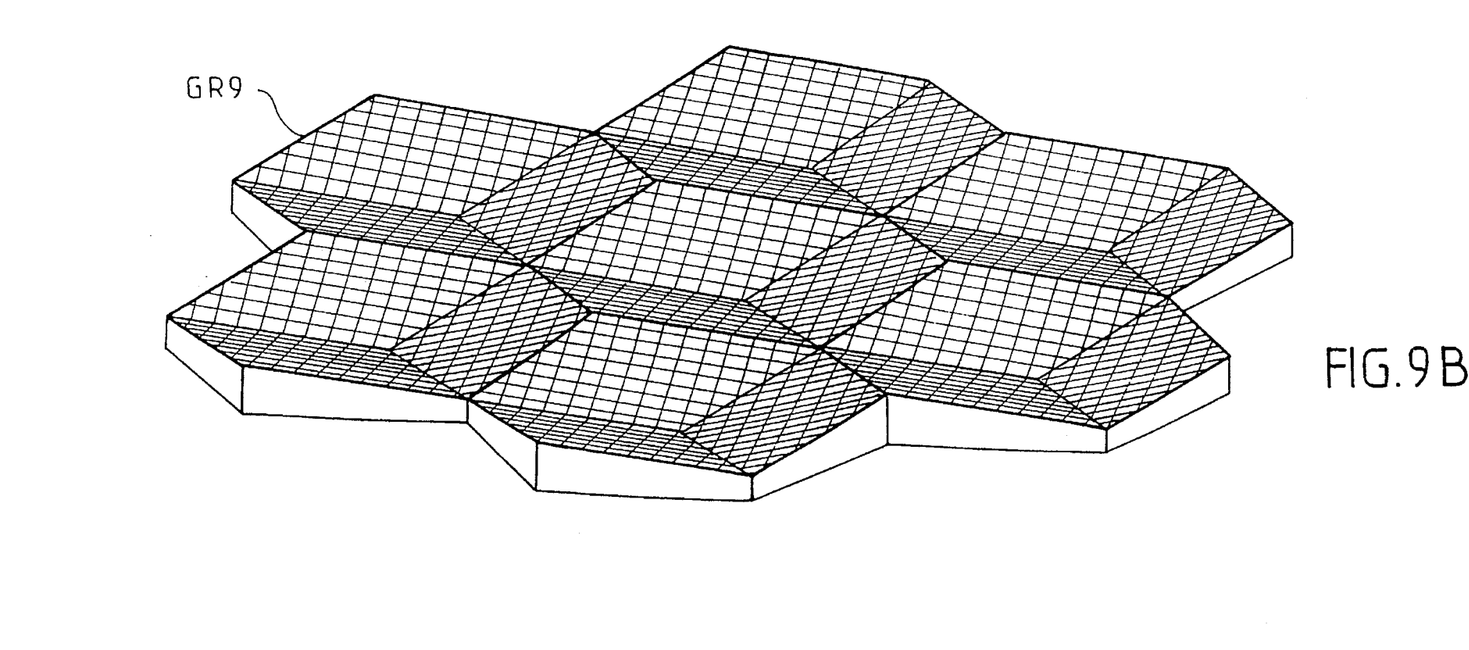

In order that the output should be really optimal, the surface area of the basic pattern must, if possible, be equal to the surface area of the array element, which is achieved with the configuration shown in FIG. 9A for a trihedron centred on a array element. The lattice thus produced is non-lacunar and the faces of the trihedron are rhombuses of the same dimensions (91, 92, 93).

The inclination of these rhombuses with respect to the plane of the lattice is calculated so as to reinforce the three orders of diffraction placed around the zero order and situated at the vertices of an equilateral triangle. This "mechanical" inclination is calculated as a function of the refractive index of the material from which the lattice is made, the pitch of the array and the wavelength domain in which the analysis is carried out.

The optimal inclination of the rhombuses with respect to the plane of the lattice being slight, the production of such lattices is a delicate operation.

One particularly advantageous means for the production of this type of lattice is described in the French patent FR-A-2 665 955 of the Applicant. It operates through the bonding together of resins with close indices and thus enables the mechanical inclination to be increased (for equal required characteristics).

The first work carried out by the Applicant on this novel lattice showed that it enables a light output of approximately 50% to be obtained with monochromatic light, in the assembly shown in FIG. 1.

Moreover, the system of fringes recorded in the analysis plane is achromatic, so long as the operating difference defect to be detected is not dependent on the wavelengths studied.

Figure 10A:
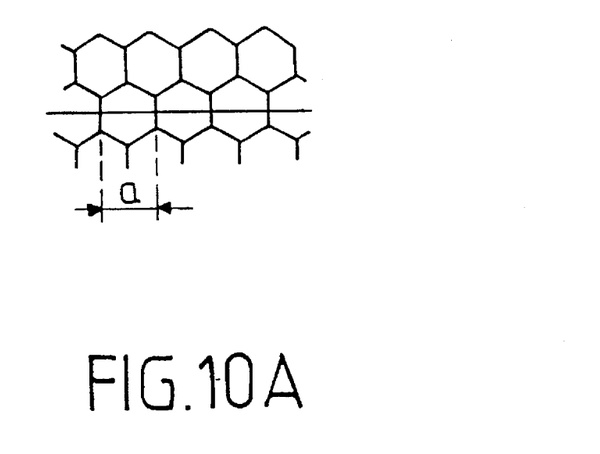
FIGS. 10A and 10B illustrate a particular lattice and the interferogram obtained according to the invention.
Figure 10B:
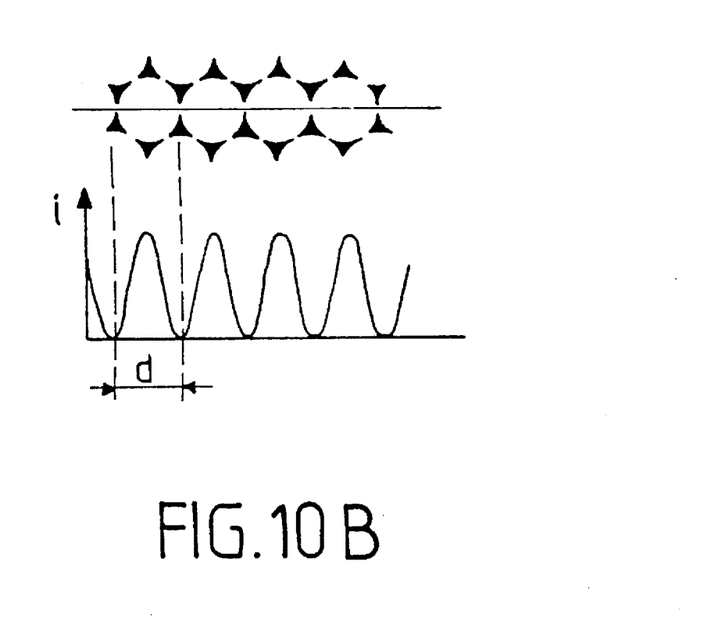

Reference will now be made to FIGS. 10A and 10B.

The basic array with a regular hexagonal pattern and pitch a (FIG. 10A) will, for example, be considered.

The interferogram obtained in the plane $P_a$ is also supported by a bidimensional array. The interferogram consists of light spots (FIG. 10B, top) whose intensity is sinusoidal, along one of the axes of the spots (FIG. 10B, bottom). The spacing d between two white fringes, in other words between two interference maxima, is related to the angle $\alpha$ between two waves by the equation:

$$d=\alpha/\lambda$$

However, for a bidimensional lattice of the same pitch in both directions, the angle between the waves is deduced from knowledge of the pitch a of the lattice and from the length of the studied wavelength $\lambda$ by the equation:

$$\alpha=\lambda/a$$

The similarity of these two equations shows that the spacing between the fringes is independent of the wavelength, and equal to the pitch of the lattice in the direction under consideration.

This is why the interferogram obtained according to the invention is achromatic.

In Patent application EP-A-0538126, a technique was also proposed for analysing interference images obtained, so as to access the gradients of phase defects of the wave surface, and then the local curvatures of the latter, and even to achieve an estimate of the error in the measurements carried out. These techniques are directly applicable to the system of interference bands obtained according to the present invention.

The interferometric assemblies according to the invention, proposed here for analysing the light wave surface, offer the following advantages:

they function in polychromatic light, their sensitivity can be adjusted continuously from zero upwards, by adjusting the distance between the analysis plane and the so-called "nil-sensitivity" plane, and this, if required, over several paths, the light intensity of the interference bands obtained is sinusoidal in several directions. It is therefore easy to sample the interference figures, with the aim of automating the analysis, the light output is improved, by the various means proposed for optimising the lattices, and in particular with the new type of lattice proposed here, finally, the error in measuring can be estimated from the measurement itself.

We claim:

1. A method for analysing the wave surface of a light beam, comprising the steps of:

(a) placing a diffraction lattice with bidimensional array in a plane perpendicular to the beam, and optically conjugate with the analysis plane of the wave surface, thereby causing a diffraction of the beam into different sub-beams, due to different orders of diffraction, and (b) creating and observing the image formed by interference of the sub-beams in a plane, an image whose deformations are related to the gradient of the wave surface analysed, wherein step (b) includes (b1) focusing the sub-beams issuing from the plane of the lattice, in an intermediate focal plane, (b2) in the vicinity of the intermediate focal plane, filtering the sub-beams by a mask suitable for selecting there at least three distinct orders of diffraction, (b3) optically picking up the selected sub-beams, in order to bring them to a so-called nil-sensitivity plane, conjugate with the plane of the lattice, and (b4) observing the interference image in a working plane, situated at a chosen distance from the nil-sensitivity plane.

2. A method according to claim 1, wherein the mask at the intermediate focal plane has a group of transparent elements and a group of reflective elements, wherein the mask, placed obliquely to the axis of the beam, has, on one and the same elliptical ring, transparent sectors alternating with reflective sectors, and wherein steps (b3) and (b4) are carried out separately for the sub-beams reflected and transmitted by the mask.

3. A device for the analysis of the wave surface of a light beam, comprising:

an entry lens, for defining a reference plane, optically conjugate with the plane in which the wave surface is analysed, a lattice with bidimensional array, placed in this reference plane, perpendicularly to the beam, which causes a diffraction of the beam into different sub-beams due to different orders of diffraction, and means for optical processing and observation of the image formed by the interference of the sub-beams, an image whose deformations are related to the gradients of the wave surface analysed, wherein the optical processing and observation means comprise:

a first lens for focusing jointly the sub-beams coming from the plane of the lattice in an intermediate focal plane, in the intermediate focal plane or close to it, a mask suitable for selecting from the sub-beams those which come from at least three distinct orders of diffraction, a second lens for taking the selected sub-beams to a so-called nil-sensitivity plane, conjugate with the plane of the lattice, and means for observing the interference image in a working plane, situated at a chosen distance from the nil-sensitivity plane.

4. A device for analyzing the wave surface of a light beam, comprising:

a diffraction lattice with a bidimensional array placed in a plane perpendicular to the beam, the diffraction lattice causing a diffraction of the beam into different sub-beams, due to different orders of diffraction; and means for creating and observing an image formed by interference of the sub-beams, the means for creating and observing including means for focusing the sub-beams issuing from the plane of the lattice in an intermediate focal plane, means, in the vicinity of the intermediate focal plane, for selecting at least three distinct orders of diffraction, the means for selecting including a mask, means for optically picking up the selected sub-beams, in order to bring them to a so-called nil-sensitivity plane conjugate with the plane of the lattice, and means for observing the interference image in a working plane, situated at a predetermined distance from the nil-sensitivity plane.

5. A device according to claim 4, wherein the mask comprises means for extracting at least three sub-beams which have similar intensities in the intermediate focal plane and which intersect the intermediate focal plane at non-aligned positions.

6. A device according to claim 5, wherein the mask is configured to extract at least three sub-beams which intersect the intermediate focal plane at the vertices of an equilateral triangle.

7. A device according to claim 6, wherein the lattice has a hexagonal array element and a pattern, these being such that a reciprocal array in the intermediate focal plane carries three orders of diffraction placed at the vertices of an equilateral triangle and of similar intensities.

8. A device according to claim 6, wherein the lattice has a rectangular array element and a pattern, these being such that a reciprocal array in the intermediate focal plane carries three orders of diffraction placed at the vertices of an equilateral triangle and of similar intensities.

9. A device according to claim 4, wherein the mask at the intermediate focal plane has at least three transparent areas forming a group of transparent elements.

10. A device according to claim 4, wherein the mask at the intermediate focal plane has at least three reflective areas forming a group of reflective elements.

11. A device according to claim 4, wherein the mask at the intermediate focal plane has a group of transparent elements and a group of reflective elements.

12. device according to claim 9, wherein the group of transparent elements of the mask, placed perpendicularly to the axis of the beam, consists of three sectors of a circular ring, the subtended angles of which are approximately 60°, and the radial extents of which are chosen as a function of the analysed spectral domain of the light beam.

13. A device according to claim 4, wherein the lattice is of the phase lattice type consisting of micro-lenses.

14. A device according to claim 4, wherein the lattice, of the intensity lattice type, consists of regions which are alternately transparent and non-transparent to light.

15. A device according to claim 4, wherein the lattice is a lattice of trihedrons, arranged to form a hexagonal array element.

16. A device according to claim 15, wherein the bidimensional array has a pattern which comprises three surfaces of equal inclination to a base plane, arranged in a third order symmetry around one and the same axis, and wherein the inclination of these surfaces is chosen as a function of the pitch of the lattice.

17. A device according to claim 16, wherein the three surfaces are rhombuses and wherein the lattice is non-lacunar.

18. A device according to claim 14, wherein the mask has at least three windows which extract at least three sub-beams having similar intensities.

19. A device according to claim 4, wherein the mask has three windows which extract three sub-beams having similar intensities, the three windows being located at the vertices of an equilateral triangle.

20. The device of claim 4, wherein the mask has a plurality of windows, and reflective elements between the windows.

* * * * *